United States Patent
Beier et al.

(10) Patent No.: US 6,549,600 B1
(45) Date of Patent: *Apr. 15, 2003

(54) METHOD AND DEVICE FOR INSPECTING A FUEL ELEMENT IN A NUCLEAR REACTOR

(75) Inventors: Martin Beier, Hausen (DE); Wolfgang Hummel, Weisendorf (DE); Wolfram Kindlein, Aurachtal (DE); Jürgen Uckert, Marloffstein (DE)

(73) Assignee: Framatome ANP GmbH, Erlangen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/668,489

(22) Filed: Sep. 25, 2000

(30) Foreign Application Priority Data

Sep. 24, 1999 (DE) ......................................... 199 45 930

(51) Int. Cl.$^7$ ................................................ G21C 17/06
(52) U.S. Cl. ........................... 376/258; 376/245; 73/625
(58) Field of Search .................................. 376/245, 248, 376/249, 252, 462, 258, 261; 73/622, 625, 627, 629; 33/174 L

(56) References Cited

U.S. PATENT DOCUMENTS

| | | | | |
|---|---|---|---|---|
| 4,008,455 A | * | 2/1977 | Pedersen ..................... 340/1 R |
| 4,274,205 A | * | 6/1981 | Starr et al. ................. 33/174 L |
| 4,605,531 A | * | 8/1986 | Leseur et al. ................ 376/252 |
| 4,728,483 A | | 3/1988 | Ahmed et al. ............... 376/258 |
| 4,892,701 A | * | 1/1990 | Mauvieux et al. ........... 376/258 |
| 5,215,706 A | * | 6/1993 | Cross et al. ................. 376/258 |
| 5,265,130 A | * | 11/1993 | Yoshida et al. .............. 376/245 |
| 5,661,766 A | * | 8/1997 | Mc Clelland et al. ...... 376/245 |
| 5,835,547 A | * | 11/1998 | Bour et al. .................. 376/248 |
| 6,125,160 A | * | 9/2000 | Gaylord et al. ............. 376/261 |

FOREIGN PATENT DOCUMENTS

| | | |
|---|---|---|
| DE | 26 04 720 | 9/1976 |
| EP | 0 080 418 A1 | 6/1983 |
| EP | 0 224 101 A1 | 6/1987 |
| EP | 0 727 787 A2 | 8/1996 |
| FR | 2 304 149 | 10/1976 |
| FR | 2 721 704 | 12/1995 |
| FR | 2 754 892 | 4/1998 |

OTHER PUBLICATIONS

Patent Abstracts of Japan No. 07–218474 Yoji), dated Aug. 18, 1995.
Patent Abstracts of Japan No. 03–252592 (Ryoichi), dated Nov. 11, 1991.
Patent Abstracts of Japan No. 02–259401 (Yasutaka), dated Oct 22, 1990.
Patent Abstracts of Japan No. 62–238406 (Hideaki), dated Oct. 19, 1987.

(List continued on next page.)

Primary Examiner—Michael J. Carone
Assistant Examiner—Daniel Matz
(74) Attorney, Agent, or Firm—Laurence A. Greenberg; Werner H. Stemer; Ralph E. Locher

(57) ABSTRACT

A method for inspecting an irradiated fuel element in a nuclear power plant includes the step of measuring, with a measuring device, a spacer of a fuel element for providing measurements of the spacer. The measuring device also measures a calibration rod for providing measurements of the calibration rod, the calibration rod having known dimensions. The measurements of the spacer are calibrated by using the measurements of the calibration rod. It is possible thereby to measure at least the maximum width of the spacer with a measuring error of less than 20 $\mu$m. A device for inspecting an irradiated fuel element in a nuclear power plant is also provided.

21 Claims, 5 Drawing Sheets

OTHER PUBLICATIONS

Patent Abstracts of Japan No. 01–307611 (Tatsuro), dated Dec. 12, 1989.

Patent Abstracts of Japan No. 03–111796 (Hasegawa), dated May 13, 1991.

Karl Baur et al., "Erfassung von Formänderungen an Brennelementen–Vergleichende Darstellung verschiedener Messverfahren" (Detecting form alterations in fuel elements–comparison of different measuring methods), Annual Meeting Nuclear Power 88, ISSN 0720–9207, pp. 473–76.

Gebelin et al., "Routine Fuel and Control Assembly Surveillance During scheduled Reactor Outages", Nuclear Power 56, 1991, No. 2, pp. 78–82.

* cited by examiner

METHOD AND DEVICE FOR INSPECTING A FUEL ELEMENT IN A NUCLEAR REACTOR

BACKGROUND OF THE INVENTION

Field of the Invention

The invention relates to a method and a device for inspecting a fuel element in a nuclear reactor. Such a fuel element includes a bundle of fuel rods. At one end of the fuel rods is a head part, and at the other end a foot part. Situated between the head and foot parts are spacers disposed one above another at axial spacings. Fuel elements in boiling water reactors are usually further surrounded by boxes.

As a rule, these fuel elements have a square cross section, that is to say the outer surfaces of the fuel element, which are formed by the outer surfaces of the head and foot parts and of the spacers or the fuel element box, are situated opposite one another in pairs. In the ideal case, two outer surfaces of a spacer are in each case parallel to one another and to the corresponding outer surfaces of the fuel element foot or head.

Wear phenomena and damage to the fuel elements can occur during operation of the reactor. Thus, for example, the cladding tube wall of the fuel rods can corrode and/or water can penetrate into individual fuel rods.

The intensive neutron emission to which the fuel element is exposed leads to a radiation-induced growth of the fuel rods and, possibly, also of the fuel element box. Inhomogeneities in the distribution of the thermal energy and the neutron flux render the growth in length dependent on location, and this can lead to bending, bowing and twisting of the fuel element. Due to irradiation and corrosion, the webs from which the spacers are produced are also subjected to growth which depends, moreover, on the rolling direction during the rolling-out of the sheet metal used.

Since the fuel elements in the reactor core are seated at a mutual spacing of only a few millimeters, such changes falsify the physical states for which the reactor operation is configured. Moreover, there are problems in removing and inserting fuel elements when the spacers have become wider or are deformed in a barrel-shaped fashion.

Usually, spent fuel elements are extracted from the reactor core in time intervals of approximately one year. The remaining fuel elements are relocated, and samples of them are checked for damage. This investigation must be carried out under water, since the irradiated fuel element is highly radioactive and must be cooled because of the development of heat during the decay of fission products. To date, the underwater inspection has mainly been undertaken using video cameras with the aid of which it is possible to detect external damage to the fuel elements such as, for example, spacers with broken corners. U.S. Pat. No. 4,605,531 discloses devices which scan the fuel elements with the aid of ultrasonic probes. For such investigations, the fuel element is brought into a defined position relative to the probes used. It is possible thereby to find damage to fuel rod cladding tube walls into which water has penetrated.

SUMMARY OF THE INVENTION

It is accordingly an object of the invention to provide a method and a corresponding device for inspecting a fuel element which overcome the above-mentioned disadvantages of the heretofore-known methods and devices of this general type and which allow to detect changes in a fuel element in a simple way.

With the foregoing and other objects in view there is provided, in accordance with the invention, a method for inspecting an irradiated fuel element in a nuclear power plant, the method includes the steps of:

measuring, with a measuring device, a spacer of a fuel element for providing measurements of the spacer;

measuring, with the measuring device, a calibration rod for providing measurements of the calibration rod, the calibration rod having known dimensions; and calibrating the measurements of the spacer by using the measurements of the calibration rod.

In accordance with another mode of the invention, a measured value for a spacing between the outer surfaces and a further measured value for a spacing between the subareas is formed for respective two points situated opposite one another on two outer surfaces of the spacer pointing in opposite directions and respectively situated opposite one another on two subareas of the calibration rod pointing in the opposite directions; and the measured value for the spacing between the outer surfaces is converted into a calibrated measured value by using the known dimensions of the calibration rod and the further measured value for the spacing between the subareas.

In accordance with yet another mode of the invention, further subareas of the calibration rod are measured, the further subareas pointing in the opposite directions and being provided offset relative to the subareas of the calibration rod.

In accordance with a further mode of the invention, further subareas of a further calibration rod are measured, the further subareas pointing in the opposite directions and being provided offset relative to the subareas of the calibration rod.

With the objects of the invention in view there is also provided, a method for inspecting an irradiated fuel element, the method includes the steps of:

providing, in a nuclear power plant, a fuel element having a bundle of fuel rods, end pieces respectively configured as a foot piece and a head piece at respective ends of the bundle, a spacer penetrated by the fuel rods between the end pieces, and further structural elements;

positioning the fuel element with one of the end pieces or the spacer against a frame, the frame defining a z-axis of a Cartesian reference system;

holding, on the frame, a calibration rod having known dimensions in an x-direction of the Cartesian reference system;

measuring a respective relative position of two outer surfaces of the spacer and of corresponding subareas of the calibration rod, the two outer surfaces of the spacer extending along a y-direction of the Cartesian reference system; and forming, with the aid of the known dimensions of the calibration rod, at least one calibrated maximum value for a spacing between the two outer surfaces of the spacer from measured values obtained during the measuring step.

In accordance with another mode of the invention, a relative position of the fuel element is varied in the Cartesian reference system for measuring further outer surfaces of the spacer by using probes and the calibration rod.

In accordance with yet another mode of the invention, the probes measure further outer surfaces of the spacer and corresponding further subareas of the calibration rod, the further outer surfaces and the further subareas extending along the x-direction.

In accordance with a further mode of the invention, the probes measure subareas of a further calibration rod, the subareas of the further calibration rod extending along the x-direction.

In accordance with another mode of the invention, further subareas of the calibration rod are measured, the further subareas being offset relative to the subareas of the calibration rod.

In accordance with another mode of the invention, given subareas of a further calibration rod are measured; and further given subareas of the further calibration rod are scanned, the further given subareas being offset relative to the given subareas of the further calibration rod.

With the objects of the invention in view there is also provided, a device for inspecting an irradiated fuel element in a nuclear reactor, including:

a positioning device for positioning a fuel element having a spacer with two outer surfaces pointing in opposite directions;

a measuring device operatively connected to the positioning device, the positioning device fixing a relative position of the spacer relative to the measuring device, the measuring device having a calibration rod with known dimensions and two subareas respectively pointing in the opposite directions, the measuring device being directed toward the two outer surfaces of the spacer and the two subareas of the calibration rod for forming measured values defining relative positions of the outer surfaces and the subareas; and a computer connected to the measuring device and storing a reference value for the known dimensions of the calibration rod, the computer or computing device being configured such that the measured values and the reference value for the known dimensions of the calibration rod are used to determine and display at least one maximum spacing between the outer surfaces, the at least one maximum spacing being calibrated with respect to the stored reference value.

In accordance with another feature of the invention, the measuring device includes two probes disposed opposite from one another and a drive for moving the probes, the drive moves the probes synchronously along the outer surfaces of the spacer and the subareas of the calibration rod.

In accordance with yet another feature of the invention, the measuring device includes a plurality of mutually oppositely disposed probes, the probes simultaneously generating measured values for a plurality of points on the outer surfaces of the spacer and the subareas of the calibration rod.

In accordance with a further feature of the invention, the measuring device includes further probes and a further calibration rod with further subareas pointing in opposite directions, the further probes are directed toward mutually oppositely disposed points on two further outer surfaces of the spacer, the two further outer surfaces respectively point in a same direction as the further subareas of the further calibration rod.

In accordance with another feature of the invention, the measuring device includes a drive for positioning the calibration rod against the spacer.

With the objects of the invention in view there is also provided, in combination with a fuel element having a bundle of fuel rods, a structural head part and a structural foot part at respective ends of the bundle, and a plurality of spacers provided between the structural head part and the structural foot part, a device for inspecting the fuel element, including:

a frame defining a z-direction of a Cartesian coordinate system;

a plane table connected to the frame, the plane table being displaceable in an x-y-plane of the Cartesian coordinate system and having two arms extending in a y-direction of the Cartesian coordinate system, the arms being configured such that one of the spacers of the fuel element can be positioned therebetween;

at least one pair of probes fitted at mutually opposite positions on the arms;

at least one calibration rod movable in the y-direction;

a computer connected to the probes, the computer storing a reference value for a length of the at least one calibration rod;

probes measuring a dimensional extension of the one of the spacers in an x-direction of the Cartesian coordinate system and the length of the at least one calibration rod; and the computer calculating at least one maximum expansion of the one of the spacers in the x-direction and calibrating the at least one maximum expansion with respect to the reference value.

In accordance with another feature of the invention, the plane table is displaceable in the z-direction and wherein one of the structural foot part and the structural head part can be positioned with respect to the frame for positioning the fuel element with respect to the frame.

In accordance with yet another feature of the invention, the frame has a base plate displaceable in the z-direction, the plane table is exchangeably mounted on the base plate, and a drive displaces the plane table in the x-direction and the y-direction on the base plate.

The invention is based on the finding that changes which are caused by the growth in the individual components of the fuel element, and other dimensional changes, for example bowing, bending and twisting of fuel element structural parts (such as spacers and fuel element boxes), impair the functionality and are therefore to be detected during inspection and measured.

According to the invention, the irradiated fuel element bundle is inspected by measuring at least one spacer of the fuel element and a calibration rod with known dimensions jointly in a measuring device. The measurements on the calibration rod serve the purpose in this case of calibrating the measurements on the spacer.

In particular, the contour of the spacer and the calibration rod can be measured in a punctiform fashion. Two points which are situated opposite one another on two first outer surfaces, pointing in opposite directions, of the spacer, can be assigned, by the measurement, a measured value for the spacing between these outer surfaces. If, for example, an ultrasonic pulse emanating from a probe is reflected at a point on the outer surface, the spacing between the point and the probe is proportional to the propagation time of the pulse-echo. Thus, if the two opposite points are measured through the use of opposite ultrasonic probes whose spacing A is known, the spacing S between two opposite points, (that is to say, in practice, the width of the spacer at this point) is given by the formula $$S = A - c(dt_1 + dt_2)$$

c representing the (temperature-dependent) propagation rate of the ultrasound, and $dt_1$ and $dt_2$ respectively representing the propagation time of the respective pulse-echo, that is to say the measured value of the measuring device. This propagation rate c can be determined in the concrete case by also measuring two points which are situated opposite one another on subareas of the calibration rod and likewise point in this direction. The same formula $$d_0 = A' - c(dt_1' + dt_2')$$

holds for this measurement of the calibration rod, $A'$ now being the known spacing between the probes directed to the subareas, and $dt_1'$ and $dt_2'$ respectively being the propagation times of the echo which is generated in each case at these points on the subareas. However, the spacing do between these subareas is known, and so the relationship $$c = (A' - d_0)/(dt_1' + dt_2') \text{ results.}$$

This relationship therefore permits the measured values $dt_1$ and $dt_2$, which are obtained on the outer surfaces of the spacer, to be converted into geometrical spacings.

In the case of other position pickups, the measuring device supplies, for example, measured voltages or other variables which are generally not proportional but can be converted into geometrical variables by a characteristic function ("calibration curve"). At least one assignment of a second measured value to a known geometrical variable is required for the purpose of determining this calibration curve. Such further points on the calibration curve can, however, be measured with the aid of the calibration rod (or a further calibration rod), if second (or further) subareas are also measured which point in opposite directions and are provided offset relative to the first subareas.

The method is carried out, in particular, under water, that is to say the measuring device with the calibration rod is disposed under water and can contain at least two opposite probes, in order to measure the outer surfaces and subareas in the way outlined. This operation can be observed by a video camera. The measurements are measured in a computer connected to the measuring device. The image picked up by the video camera is displayed on a display screen, for example together with suitably selected, calibrated measured values. The calibrated measured value for the maximum spacing between mutually opposite outer surfaces of the spacer is of particular interest as characteristic quantity.

The use of two probes which simultaneously scan two mutually opposite points on the outer surfaces of the spacer lying therebetween has the advantage that the mutual spacing between the points (that is to say the width of the spacer) is formed by subtracting the probe signals. This spacing is then independent of which spacings there are between the probes and the outer surfaces; systematic measuring errors can thus cancel one another out. Moreover, temporary influences which could falsify a measurement are also compensated, since the measurement is calibrated with each measuring operation.

A corresponding inspection device therefore contains a measuring device with a calibration rod of known dimensions, a positioning device and a computer. The positioning device fixes the relative position of a spacer of a fuel element with respect to the measuring device, and the measuring device is directed toward two first outer surfaces, pointing in opposite directions, of the spacer and two first subareas, pointing in these directions, of the calibration rod. The measuring device can therefore form measured values for the relative position of the outer surfaces and subareas. The computer is configured in such a way that the measured values and a stored reference value for the dimensions of the calibration rod are used to determine and display at least one maximum spacing between the outer surfaces, the at least one maximum spacing being calibrated through the use of this reference value.

The positioning device has a holder into which the fuel element can be inserted in the direction of its longitudinal axis, that is to say in the vertical direction, and is also fixed in the horizontal direction. The positioning device also advantageously contains a positioning drive with the aid of which the vertical position of the measuring device with the calibration rod can be varied. It is then possible to measure sequentially a plurality of spacers of the fuel element and, if appropriate, also the foot part and/or head part.

The measuring device advantageously also contains a second drive with the aid of which the calibration rod can be laid against the spacer.

The measuring device advantageously contains a plurality of mutually opposite probes which simultaneously form measured values for a plurality of points on the first outer surfaces and subareas. It is possible to use this device to determine with high accuracy all characteristic quantities of the spacer which depend not on the relative position of the spacer outer surfaces in the measuring device, but only on the mutual position of these outer surfaces.

A pair of mutually opposite outer surfaces of the spacer can be measured in the way outlined so far. However, a square spacer has a further pair of outer surfaces, which likewise point in opposite directions. These can be measured through the use of the same measuring device and the same calibration rod when the position of the spacer with reference to the measuring device is appropriately rotated. Therefore, it is also possible to use a measuring device which contains further probes which are directed toward these second outer surfaces and corresponding second subareas of the calibration rod (or a further calibration rod).

In a specific variant of the method, the fuel element is positioned with an end piece (for example the head or the foot) or a spacer on a frame which fixes a z-axis of a Cartesian reference system. Held on this frame is the calibration rod, whose dimensions in the x-direction of the Cartesian reference system are known. The spacer and the calibration rod are positioned in the frame in such a way that two first outer surfaces of the spacer and two first subareas of the calibration rod extend along the y-direction. Measuring these outer surfaces and subareas yields measured values from which, in the way already described, through the use of the known dimensions of the calibration rod, at least one calibrated maximum value is formed for the spacing between the two first outer surfaces of the spacer.

It is advantageous when, for the purpose of measuring, two mutually opposite probes are guided synchronously along the first outer surfaces of the spacer and the first subareas of the calibration rod, giving rise sequentially in the process to the formation at least of measuring signals which correspond to the mutual spacing between two opposite points on the outer surfaces of the spacer and the subareas of the calibration rod. The measuring signals for the known spacing between the subareas are then used in order to convert the measuring signals for the outer surfaces into calibrated measured values automatically in a computer.

However, it is also possible to use a plurality of probes for measuring which are situated opposite one another in pairs and are used simultaneously to measure a plurality of points situated opposite one another in pairs, on the first outer surfaces of the spacer and the first areas of the calibration rod (preferably also on second subareas of the same calibration rod or another calibration rod). It is possible in this way also to measure a pair of second outer surfaces of the spacer which extend along the x-direction. The measured values obtained on these second outer surfaces can be calibrated in the way described through the use of the calibration rod already used for the first outer surfaces, but it can be advantageous for the purpose of increasing the accuracy also to measure second subareas of the calibration rod (or another calibration rod) which likewise extend along the x-direction.

A corresponding specific device therefore contains a frame which fixes the z-axis of a Cartesian coordinate system, and a plane table which can be displaced in the x-, y-plane of the Cartesian coordinate system and has two arms which extend in the y-direction and between which a spacer of the fuel element can be positioned. These arms contain at least one pair of mutually opposite probes. Furthermore, at least one calibration rod is provided which can be moved in the y-direction and can be held on the frame independently of the plane table or can also be part of the plane table itself. Connected to the probes is a computer in which a reference value for the length of the calibration rod is stored.

The probes can then be used to measure the expansion of the spacer in the x-direction and the length of the calibration rod, the computer being configured such that it is possible to calculate there at least one maximum expansion of the spacer in the x-direction, the at least one maximum expansion being calibrated through the use of the reference value.

The fuel element is advantageously positioned with the foot or head on the frame, while the plane table can be displaced in the z-direction.

In particular, it is advantageous when the plane table is mounted exchangeably on a base plate which can be displaced in the z-direction, and at least the arms can be displaced in the x-direction and y-direction with reference to the base plate through the use of a drive. When the plane table is dismounted, the frame can be used with the base plate as carrier for further devices with the aid of which other measurements and/or repair work are undertaken on the fuel element.

Thus, by contrast with the ideal dimensions of the components of the fuel element, the invention can be used also to measure deviations in the dimensions which are 20 $\mu$m or less. It is then possible to decide reliably whether the geometry of the fuel element allows its further use—if appropriate, by replacing deformed spacers, or relocating a deformed fuel element into a position in the core at which the radiation and/or mechanical load leads to a deformation of the fuel element which cancels out again the measured deformation.

In addition, the relative position of the outer surfaces with respect to the corresponding outer surfaces at the end of the bundle, that is to say the head part and/or foot part of the fuel element, can also be measured. Bowing or twisting of the fuel rod bundle can thereby be detected. For example, a bowed bundle can then be rotated by 180° and be reinserted in the same position, after which it is possible to wait until it bows back again during further operation. Even in a boiling-water fuel element whose box is still scarcely deformed, it is, specifically, possible for a bowed or twisted fuel rod bundle to have the effect that the bundle is no longer optimally centered in the box.

Other features which are considered as characteristic for the invention are set forth in the appended claims.

Although the invention is illustrated and described herein as embodied in a method and device for inspecting a nuclear reactor fuel element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
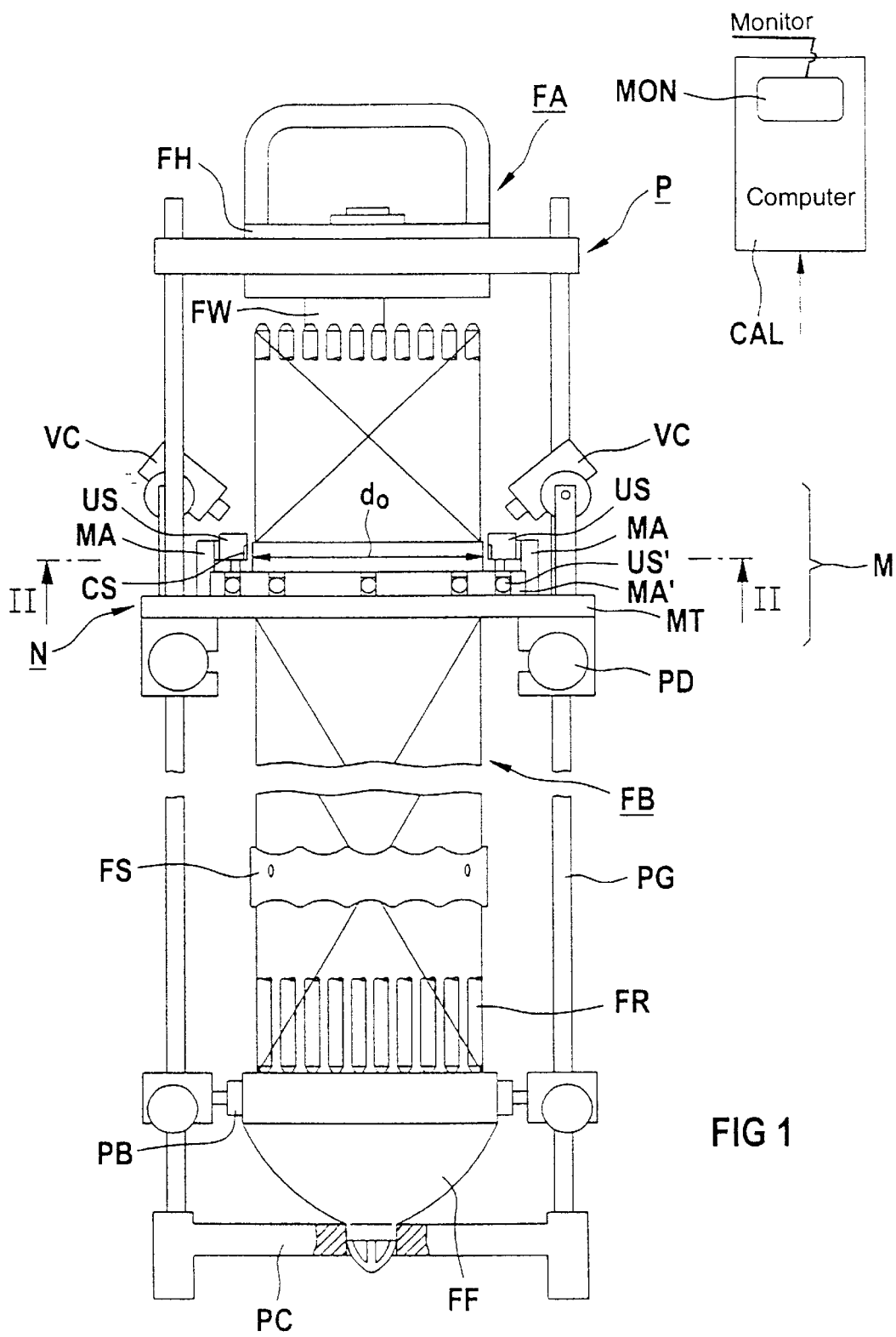
FIG. 1 is a diagrammatic elevational side view of an exemplary embodiment of the device according to the invention with an inserted fuel rod bundle of a boiling-water fuel element.

Referring now to the figures of the drawings in detail and first, particularly, to FIG. 1 thereof, there is shown how a fuel element FA of a boiling-water reactor is inspected. The lateral box has been removed such that the fuel rod bundle FB including the schematically indicated fuel rods FR is visible. The fuel rods are held at a plurality of axial positions, in each case by a spacer FS at prescribed positions distributed regularly over the fuel element cross section. Located in the middle of the fuel element is a hollow tube or cladding tube ("water tube" FW), on which the foot part FF and the head part FH of the fuel element are fastened.

The fuel element bundle FB with the head part and the foot part is inserted into a positioning device P, in this case the foot part FF engaging in a centering plate PC and being fixed in its position via hydraulically pressed-on lateral jaws PB. The positioning device P further contains a frame, which is constructed here as a rack PG made from guide rails for a plane table MT. The guide rails PG define the z-axis of a reference system whose center point and x-, y-axes are given by the center point and the alignment of the centering plate PC.

The plane table MT is part of a measuring device M which can be displaced in the z-direction through the use of drives PD, and is positioned at the level of a spacer of the fuel rod bundle FB.

Such a plane table, which can be displaced along the fuel rod bundle relative to the fuel rods and their spacers, is already used for inspection devices and generally carries a video camera VC in order to undertake optical inspection of the fuel rods and the spacers. It is usual in this case for the video camera also to move in the x- and y-directions relative to the fuel rod bundle, in order to monitor the fuel element from all sides. In the present case, a plurality of video cameras are provided at the plane table MT in order to monitor the spacer completely without having to change the relative position of the plane table MT.

In FIG. 1, the spacer to be inspected, which is a part of the fuel element bundle FB, is hidden by the measuring device M. However, it is possible to see two mutually opposite arms MA of the measuring device M, which run along the left-hand and right-hand outer surface of this spacer and carry probes US which are configured as ultrasonic probes. These ultrasonic probes US are directed partly toward the left-hand or right-hand outer surface of the spacer, and partly also toward the end faces of a calibration rod CS of known length $d_0$. These ultrasonic probes US emit ultrasonic pulses which are reflected at the outer surfaces of the spacer or the end faces of the calibration rod CS. The reflected echo is received by the ultrasonic probes US and it is therefore possible to determine the spacing of the spacer from the propagation time of the pulse echo.

The calibration rod CS, disposed on the front side and the rear side of the fuel rod bundle, is mounted in each case on a further measuring arm MA', which likewise carries a plurality of ultrasonic probes US'. It is thereby also possible to measure the outer surfaces of the spacer on the front side (visible in FIG. 1) of the fuel rod bundle and the opposite rear side. The outermost ultrasonic probes of these further measuring arms MA' are directed toward the end faces of further calibration rods (covered in FIG. 1) which are located below the measuring arms MA.

Figure 2:
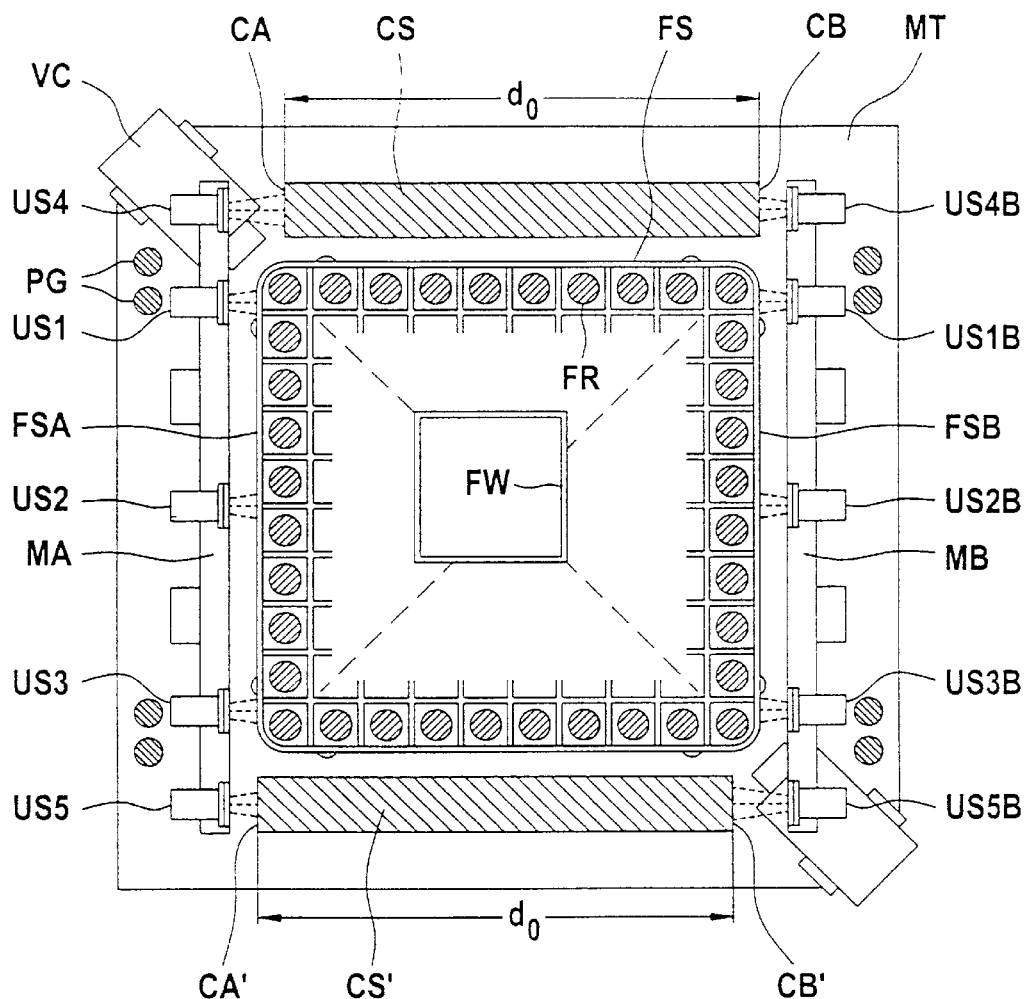
FIG. 2 is a diagrammatic cross-sectional view of an exemplary embodiment of the device according to the invention with an inserted fuel rod bundle of a boiling-water fuel element.

In the cross section through the plane II—II in FIG. 1, which is shown in FIG. 2, it may be seen that the three ultrasonic probes US1, US2 and US3 at three measuring points on the left-hand outer surface FSA of the spacer FS measure the spacing of this spacer from the corresponding, left-hand measuring arm MA. The outer ultrasonic probes US4 and US5, by contrast, measure the spacing of the end faces CA or CA' of the corresponding calibration rod CS or CS' extending from left to right. The spacings between these end faces CA and CA', on the one hand, and the measuring probes US4 and US5 differ, but are known, and so these two probes US4 and US5 supply two calibration points for the relationship between the propagation time of the ultrasonic echo and the arc covered.

Corresponding probes US1B to US5B are situated opposite the probes US1 to US5 on the right-hand arm MB.

In the same way, these ultrasonic probes on the opposite outer surface FSB of the spacer report three measuring points for the spacing, and two calibration points on the corresponding end faces CB, CB' of the callbration rods. Since the length do of each calibration rod CS, CS' is known, this also results in an exact value for the spacing of the opposite measuring arms in this plane, or a computational correction if the measuring arms are not strictly parallel to one another.

In the same way, in the plane lying therebelow, in which the ultrasonic probes US' shown in FIG. 1 are situated, three measuring points and two calibration points are formed in each case for the two other mutually opposite sides of the spacer.

The signals from the sensors are fed to a computer CAL with a monitor MON which is provided outside the water reservoir in which the inspection takes place. This is an electronic evaluation system which selects the sensor signals in a suitable way, calibrates them and displays them as characteristic variables of the measured spacer, as is explained with the aid of an image (FIG. 3) output on a display screen.

Figure 3:
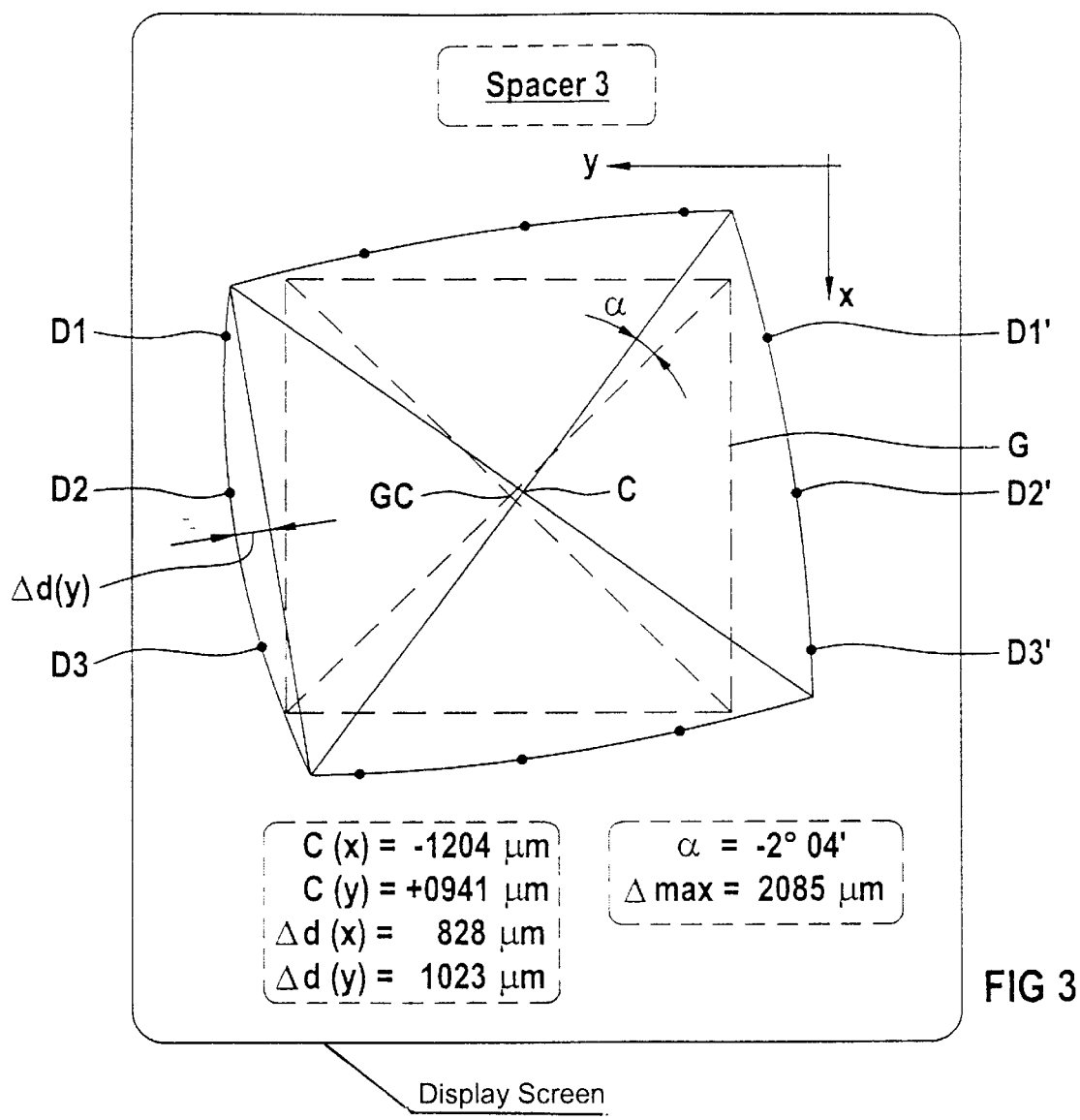
FIG. 3 is a graph illustrating a mathematical evaluation of the measurement.

In this FIG. 3, firstly, the geometry G of an unbowed fuel element is demonstrated; the center GC thereof would be disposed at the coordinate origin of the x-y system of the measuring device M. D1, D2, D3 illustrate the three measuring points of an outer surface, and D1', D2', D3' illustrate the corresponding, already calibrated measuring points at the opposite outer surface, which result from the ultrasonic echoes.

The most important variables for assessing the relevant spacer (here: the third spacer, "spacer 3") is the maximum spacing $\Delta$max between opposite outer surfaces. If the fuel element is not twisted, this is the maximum value of the variables $\Delta(y_1)$, $\Delta(y_2)$, $\Delta(y_3)$, $\Delta(x_1)$, $\Delta(x_2)$, $\Delta(x_3)$, wherein $\Delta(y_1)$ is the difference between the y-coordinates on the mutually opposite points D1, D1'. The differences $\Delta(y_2)$ and $\Delta(y_3)$ are assigned correspondingly to the respectively mutually opposite points D2, D2' and, respectively, D3, D3', and the differences $\Delta(x_1)$, $\Delta(x_2)$, $\Delta(x_3)$ of the x-coordinates are assigned to the further point pairs illustrated in FIG. 3. The value $\Delta$max can then be specified directly-in micrometers or as a percentage with respect to the ideal fuel element. The variable $\Delta d(y)$, which describes a convex curvature of the outer surfaces, can be determined, for example, in accordance with $\Delta d(y) = \Delta(Y_2) - (\Delta(y_1) + \Delta(y_3))/2$.

A further interesting variable is the x-coordinate C(x) or y-coordinate C(y) of the center point C (which can be determined from the two measuring points D2, D2') refer to the desired center point GC (origin of coordinates). The bowing of the entire bundle can be determined thereby.

In order also to detect twisting of the spacer, it is possible, for example, to determine the angle between the straight line defined by the measuring points D1' and D3 and the y-axis.

In the display, illustrated in FIG. 3, on the display screen of the computer CAL, a curve of second order is drawn through the points D1, D2 and D3 by computation, and the same is done for the corresponding measuring points on the other outer surfaces. These curves and their point of intersection are illustrated as contour of the measured spacer. The coordinates C(x) and C(y) for the center point of the deformed spacer describe the bowing of the fuel element and result from the point of intersection of the connecting lines which are respectively calculated from the diametrical corners of the illustrated contour, calculated from the measuring points, of the deformed spacer. The angle $\alpha$ describes the twisting of the fuel element and corresponds to the mean value of the angle by which in each case a diagonal of the deformed spacer is rotated relative to the corresponding diagonal of the geometry G. The connecting straight lines between two neighboring corners describe the outer contour of an undented, but twisted spacer whose deviation from the geometry G can be described by the values $\Delta d(x)$ and $\Delta d(y)$. The maximum width of the spacer is described by the value $\Delta$max.

As a rule, it suffices to display these calibrated, characteristic measured values on a display or to blend them into the display screen, while the remainder of the image can be used in order to make the video images of the camera VC available to the operating staff for the optical inspection of the spacer.

Figure 4:
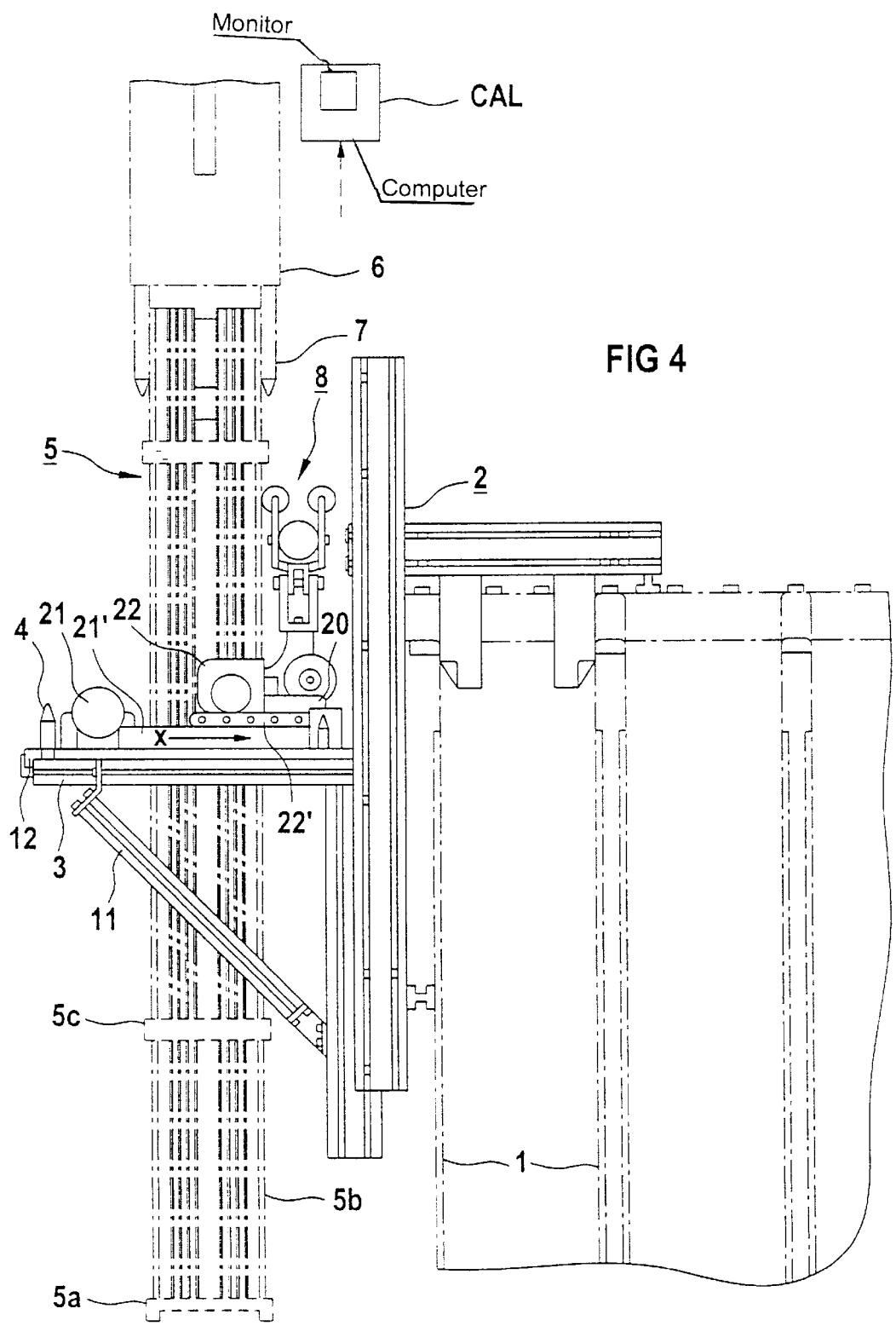
FIG. 4 is a diagrammatic side elevational view of an exemplary embodiment of a device according to the invention with a pressurized-water fuel element.

The walls 1 of a fuel element storage rack in the fuel element cooling pond of a nuclear power plant are visible in FIG. 4. Also illustrated are only the foot part 5a, the control rod guide tubes 5b and the spacers 5c of the fuel element 5. Mounted on the top side of this storage rack is a frame 2 which forms a workstation with a frame part 11 and a platform 3 which laterally surround the fuel element. Various apparatuses which are provided for inspecting and/or maintenance can be mounted on positioning bolts 4. A pressurized-water fuel element 5 is transported to this workstation through the use of a fuel element handling machine, only the lower end 6 of the fuel handling machine mast with the centering bolt 7 being visible in FIG. 4. It is not explicitly shown in the following figures that the centering bolts 7 can be used to position the mast 6 on the frame 2 and then to place the fuel element in a defined position relative to the frame, which defines the reference system for measuring the fuel element.

Mounted on the platform 3 is a base plate 12 which bears a plane table 20 which can be displaced via an x-drive 21 and a y-drive 22 along corresponding x- and y- guide rails 21', 22'. The face of the plane table 20 is parallel in this case to the x-y plane of a reference system whose z-axis is given by the frame 2 and the mast 6 of the handling machine. These parts therefore constitute a positioning device which can simultaneously provide a coordinate system for evaluating measured values. Via the drives 21, 22, the plane table can be moved in the plane to a desired position in the x-direction and/or y-direction. A module 8 which contains a measuring device is fastened on the plane table.

Figure 5:
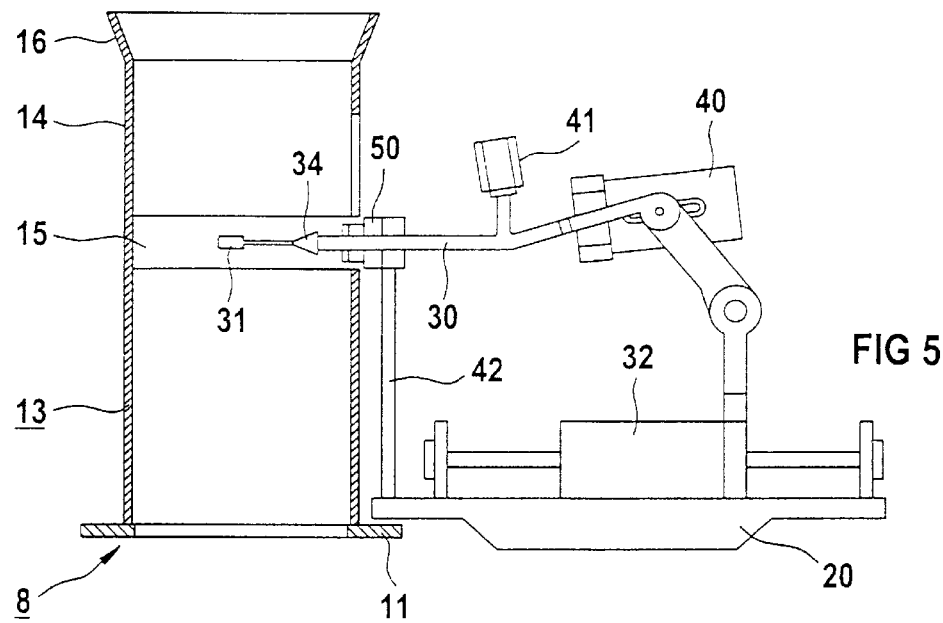
FIG. 5 is a diagrammatic, sectional side view of a receiving shaft and a plane table, provided thereon, for the exemplary embodiment according to FIG. 4.

This module 8 is illustrated in FIG. 5, in which the plane of a drawing is parallel to the y-z plane of the reference system described above. Also shown is a shaft 13 which is provided chiefly for fixing the fuel element to be inspected in cases in which the foot of the fuel element is not fixed in the way shown in FIG. 1, but is still suspended in the mast 6 of the handling machine. The shaft can be fastened on the plane table or, via a plane part 11, on the base plate 12 or the platform 3. It includes shaft walls 14, which support the fuel element laterally and have on three sides a transverse slot 15 through which it is possible to access the three outer surfaces of the fuel element and/or the spacer 5c thereof. Positioned at the upper edges of the shaft walls are guide planes 16, which run in obliquely, from above, onto the edges of the shaft walls and serve the purpose of facilitating the introduction of the fuel element into the shaft.

Figure 6:
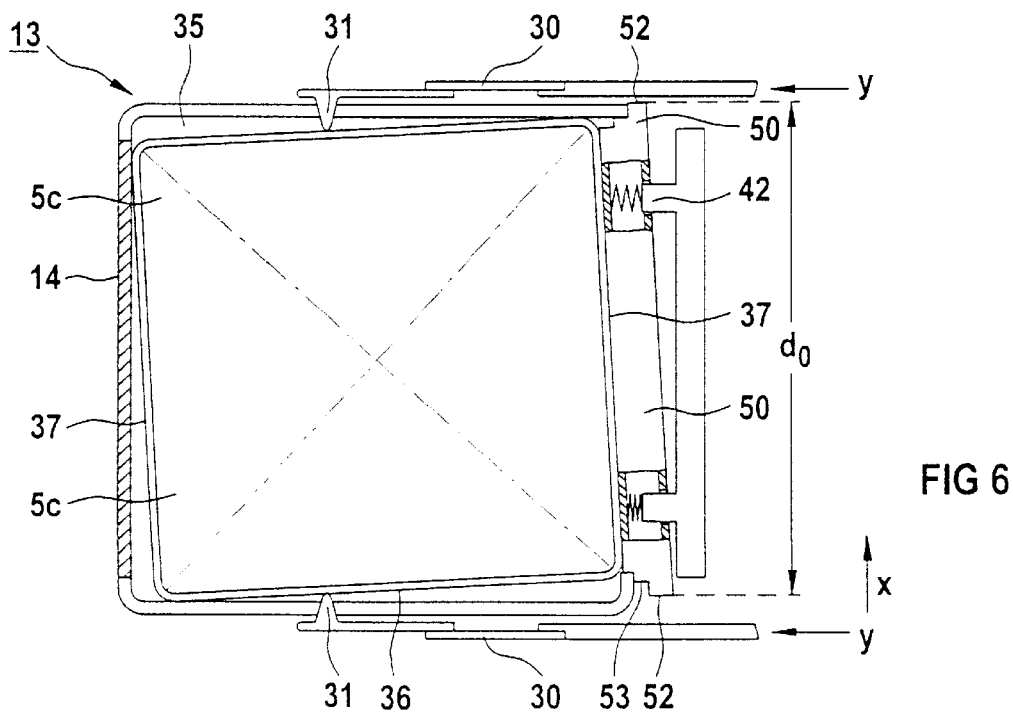
FIG. 6 is diagrammatic, sectional plan view of the calibration rod and the probes.

The measuring device has two mutually opposite measuring arms 30 at one end of which there is a probe 31 in each case. At their other end, the measuring arms are respectively connected to the remainder of the module via a feed drive 32 operating in the y-direction. The measuring arms are provided in this case such that their longitudinal axis is parallel to the y-axis of the reference system, and that the probes can respectively be laid through the transverse slots 15 against one of the two opposite outer surfaces 35, 36 of the fuel element or spacer 5c, which are virtually parallel to the longitudinal axis of the measuring arms. The arms are advantageously fitted such that their mutual spacing can be set, in which case it is then possible to use the device for fuel elements with different widths. The device can be used, for example, to measure the boxes and the spacers in the case of boiling-water fuel elements. FIG. 6 also shows further outer surfaces 37 of the spacer 5c, which can also be inspected.

Optical monitoring via a video camera is provided for the purpose of remotely controlling the positioning of the measuring arms via the x- and y-drives. The camera 40 and the associated lighting 41 are therefore fitted on the plane table itself, or are components of the module mounted on the plane table.

Also to be seen in FIG. 5 is a calibration rod 50, which is illustrated more precisely in FIG. 6. This FIG. 6 shows the shaft 13 with the walls 14, and the probes 31, which grip through the transverse slots onto two opposite outer surfaces of a spacer 36, and arms 30 of the probes.

The plane of the drawing in FIG. 6 is parallel to the x-y plane of the reference system. In this exemplary embodiment, the calibration rod 50 is fastened on the plane table 20 via a holder 42 which is positioned by the x- and y-drive 21, 22 on the spacer 36 until it bears resiliently with a defined pressure. To render interpolation possible during calibration, the end faces of the calibration rod 50 are configured in three steps, that is to say they have a plurality of respectively mutually opposite subareas 52, 53. The steps are configured such that the calibration rod prescribes three linear measures, of which at least one is larger, and one smaller, than the mutual spacing of opposite outer surfaces of the fuel element to be measured. It is possible in this way to use interpolation to draw a calibration curve for the relationship between probe-measured data and the expansion of the fuel element.

The measuring arms 30 can be moved synchronously in the y-direction via a feed 32. They can, for example, be stiff and mounted rotatably at one end such that the deviation of the probes in the x-direction can be detected by a rotary encoder on the rotatable bearing. A hydraulic drive can also be used, for example, instead of a y-feed for the purpose of extending the telescopic arms.

Figure 8:
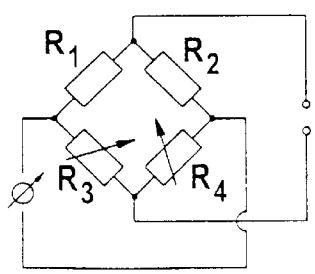
FIG. 8 is a schematic diagram of the circuitry for the strain gauges of FIG. 7.
Figure 7:
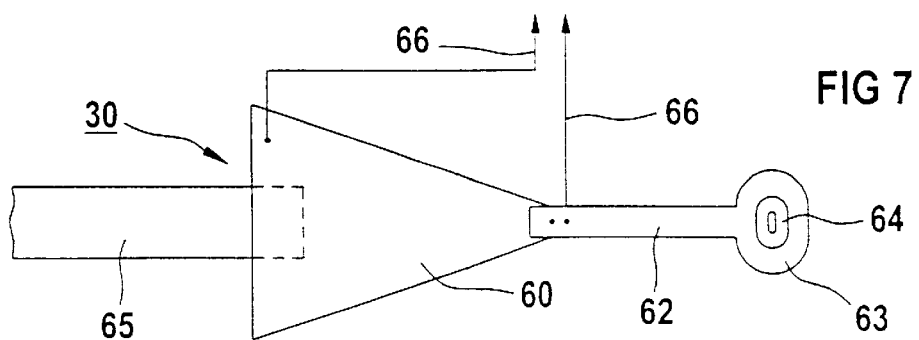
FIG. 7 is a diagrammatic plan view of the strain gauges for the exemplary embodiment of FIG. 4.

In the exemplary embodiment illustrated in FIG. 5, a part 34 of the arm is constructed as a spring which bears strain gauges on both sides. The resistance of the strain gauges is measured via a Wheatstone bridge circuit for the purpose of determining the position of the probes. FIG. 7 shows such a measuring arm in detail, and FIG. 8 shows a circuit diagram of the bridge circuit.

FIG. 7 shows the arm 30 with the probe 63, which slides with a camber or bulge 64 along the outer surfaces of the fuel element. The arm contains an approximately triangular spring 60. A rigid part 62 of the arm with the probe 63 is attached at one corner of this spring. The rigid part 65, connected to the y-drive 32, of the arm is fastened on the opposite side of the spring. The triangular shape of the spring is favorable, because in this way the spring tension is distributed uniformly over the entire length of the spring and exhibits a virtually linear dependence on the x-deflection of the probe. The two triangular faces of the spring are coated, and each form a strain gauge. The electrical resistance of each strain gauge depends approximately linearly on the spring tension.

Consequently, it is possible to use the measurement of these resistances to calculate measured values for the x-position of the probe, which can be calibrated by the measured values which are obtained on the calibration rod.

The strain gauges on the faces of the spring 60 are connected via connections 66 to the bridge circuit 68 of an electronic measuring system, for example an electronic evaluation device integrated in the computer CAL.

A circuit diagram of the bridge circuit 68 is shown in FIG. 8. $R_1$ and $R_2$ are the resistances to be measured of the two strain gauges. They are connected in a Wheatstone bridge circuit to adjustable resistors $R_3$ and $R_4$. To balance the bridge, the current I is controlled to zero by suitable adjustment of $R_3$ and/or $R_4$. The voltages which are present across $R_1$ and $R_2$ or $R_3$ and $R_4$ are then respectively of the same absolute value.

If the spring with the strain gauge is in a position of rest, $R_1$ and $R_2$ are of the same magnitude; $R_3$ and $R_4$ must then likewise become equal, so that balancing comes about. If the spring is deflected, one strain gauge is stretched while the other is compressed, that is to say one of the resistances becomes larger while the other becomes smaller. The ratio of the two adjustable resistors $R_3$ and $R_4$ then corresponds, with the bridge balanced, to the ratio of the resistances $R_1$ and $R_2$ to be measured. Effects which are to be ascribed to thermal expansion are largely eliminated with this method, since $R_1$ and $R_2$ change in the same sense.

The measurement itself is advantageously carried out using AC voltage employing the known carrier frequency principle. A connected measuring amplifier can then be calibrated such that it directly specifies the tension of the spring and/or the deflection of the probe.

The invention therefore renders it possible for the geometry of the fuel element to be measured in a simple way, and for deformations to be detected.

We claim:

1. A method for inspecting an irradiated fuel element having a spacer with two outer surfaces in a nuclear power plant, the method which comprises:

measuring, with a measuring device, a respective relative position of the two outer surfaces of the spacer of the fuel element;

measuring, with the measuring device, a calibration rod for providing measurements of the calibration rod, the calibration rod having known dimensions; and calibrating, with a computing device connected to the measuring device, the measurements of the spacer by comparing the measurements of the calibration rod with the known dimensions of the calibration rod.

2. The method according to claim 1, which comprises:

forming, for respective two points situated opposite one another on two outer surfaces of the spacer pointing in opposite directions and respectively situated opposite one another on two subareas of the calibration rod pointing in the opposite directions, a measured value for a spacing between the outer surfaces and a further measured value for a spacing between the subareas; and converting the measured value for the spacing between the outer surfaces into a calibrated measured value by using the known dimensions of the calibration rod and the further measured value for the spacing between the subareas.

3. The method according to claim 2, which comprises measuring further subareas of the calibration rod, the further subareas pointing in the opposite directions and being provided offset relative to the subareas of the calibration rod.

4. The method according to claim 2, which comprises measuring further subareas of a further calibration rod, the further subareas pointing in the opposite directions and being provided offset relative to the subareas of the calibration rod.

5. The method according to claim 1, which comprises:

disposing the measuring device with the calibration rod under water;

providing the measuring device with a video camera and with at least two probes disposed opposite from one another;

evaluating the measurements of the spacer and of the calibration rod with the computing device; and displaying, on a display screen, an image picked up by the video camera and displaying at least one calibrated measured value, calculated in the computing device, indicating a maximum spacing between outer surfaces of the spacer disposed opposite from one another.

6. The method according to claim 1, which further comprises:

carrying out the step of measuring the respective relative position of the two outer surfaces of the spacer extending along a y-direction of the Cartesian reference system with the measuring device, carrying out the step of measuring the calibration rod by corresponding subareas of the calibration rod with the measuring device, providing the fuel element with a bundle of fuel rods, end pieces respectively configured as a foot piece and a head piece at respective ends of the bundle, penetrating the spacer by the fuel rods between the end pieces;

positioning the fuel element with one of the end pieces or the spacer against a frame, the frame defining a z-axis of a Cartesian reference system;

holding, on the frame, the calibration rod having known dimensions in an x-direction of the Cartesian reference system; and deriving, by using the known dimensions of the calibration rod and the value for the respective relative position of two outer surfaces of the spacer, at least one calibrated maximum value for a spacing between the two outer surfaces of the spacer.

7. The method according to claim 6, which comprises:

performing the measuring step by guiding two probes disposed opposite one another synchronously along the outer surfaces of the spacer and along the subareas of the calibration rod and, in the process, sequentially generating at least measuring signals corresponding to respective spacings between two opposite points on the outer surfaces of the spacer and on the subareas of the calibration rod; and automatically converting the measuring signals corresponding to the respective spacings between the two opposite points on the outer surfaces of the spacer into calibrated measured values with the computing device by using the measuring signals of a known spacing between the subareas of the calibration rod.

8. The method according to claim 7, which comprises varying a relative position of the fuel element in the Cartesian reference system for scanning further outer surfaces of the spacer by using the probes and the calibration rod.

9. The method according to claim 6, which comprises using a plurality of probes for the measuring step, the plurality of probes being situated opposite one another in pairs and simultaneously measuring a plurality of points situated opposite one another in pairs on the outer surfaces of the spacer and on the corresponding subareas of the calibration rod.

10. The method according to claim 9, which comprises scanning, with the plurality of probes, further outer surfaces of the spacer and corresponding further subareas of the calibration rod, the further outer surfaces and the further subareas extending along the x-direction.

11. The method according to claim 9, which comprises measuring, with the plurality of probes, subareas of a further calibration rod, the subareas of the further calibration rod extending along the x-direction.

12. The method according to claim 6, which comprises measuring further subareas of the calibration rod, the further subareas being offset relative to the subareas of the calibration rod.

13. The method according to claim 6, which comprises:

measuring given subareas of a further calibration rod; and measuring further given subareas of the further calibration rod, the further given subareas being offset relative to the given subareas of the further calibration rod.

14. The method according to claim 1, wherein the step of measuring the calibration rod is performed every time the respective relative position of the outer surface of the spacer of the fuel element is measured.

15. A method for inspecting an irradiated fuel element having a spacer with two outer surfaces in a nuclear power plant, the method which comprises:

measuring, with a measuring device, a respective relative position of the two outer surfaces of the spacer of the fuel element;

measuring, with the measuring device, a calibration rod for providing measurements of the calibration rod, the calibration rod having known dimensions; and calibrating the measurements of the spacer by comparing the measurements of the calibration rod with the known dimensions of the calibration rod.

16. A device for inspecting an irradiated fuel element having a spacer with two outer surfaces, comprising:

a measuring device having a calibration rod with known dimensions, said measuring device being directed toward the two outer surfaces of the spacer and said calibration rod for forming measuring values defining relative positions of the outer surfaces and said calibration rod; and a computing device connected to said measuring device for calibrating the measurements of the spacer by comparing the measurements of the calibration rod with a known dimensions of the calibration rod.

17. The device according to claim 16, further comprising a positioning device for positing the fuel element relative to said measuring device, said positioning device having a holder for receiving the fuel element to cause the fuel element to be inserted, with respect to a longitudinal axis thereof, in a vertical direction and to cause the fuel element to be fixed in a horizontal direction, and said positioning device including a positioning drive for moving said measuring device with said calibration rod in the vertical direction.

18. The device according to claim 16, wherein said measuring device includes two probes disposed opposite from one another and a drive for moving said probes, and said drive moves said probes synchronously along the outer surfaces of the spacer and said calibration rod.

19. The device according to claim 16, wherein said measuring device includes a plurality of mutually oppositely disposed probes, said probes simultaneously generating measured values for a plurality of points on the outer surfaces of the spacer and said calibration rod.

20. The device according to claim 19, wherein said measuring device includes further probes and a further calibration rod pointing in opposite directions, said further probes are directed toward mutually oppositely disposed points on two further outer surfaces of the spacer, and the two further outer surfaces respectively point in a same direction as said further calibration rod.

21. The device according to one of claim 16, wherein said measuring device includes a drive for positioning said calibration rod against the spacer.

* * * * *